W. J. ROTHMANN.
ANTISPLASHER ATTACHMENT FOR AUTOMOBILES.
APPLICATION FILED APR. 2, 1921.

1,403,446.

Patented Jan. 10, 1922.

William J. Rothmann,
INVENTOR

BY Victor J. Evans
ATTORNEY

UNITED STATES PATENT OFFICE.

WILLIAM J. ROTHMANN, OF NEW YORK, N. Y.

ANTISPLASHER ATTACHMENT FOR AUTOMOBILES.

1,403,446. Specification of Letters Patent. Patented Jan. 10, 1922.

Application filed April 2, 1921. Serial No. 458,165.

*To all whom it may concern:*

Be it known that I, WILLIAM J. ROTHMANN, a citizen of the United States, residing at New York city, in the county of New York and State of New York, have invented new and useful Improvements in Antisplasher Attachments for Automobiles, of which the following is a specification.

This invention relates to an anti-splasher attachment for automobile or other vehicle wheels, and the principal object is to provide resilient means attachable to a vehicle wheel for intercepting water or mud splashed by the tire of the wheel when the vehicle is being driven.

Another object is to provide a frame which may be attached to a vehicle wheel and provided with anti-splash flaps which may be attached to and detached from the frame so that the frame may be left in attached position and the flaps removed when not needed.

With these and other objects in view which will be apparent as the nature of the invention is more fully understood, the invention resides in certain novel features of construction and combination and arrangement of parts, the essential features of which are hereinafter fully described, are particularly pointed out in the appended claims, and are illustrated in the accompanying drawing, in which:—

Figure 1:
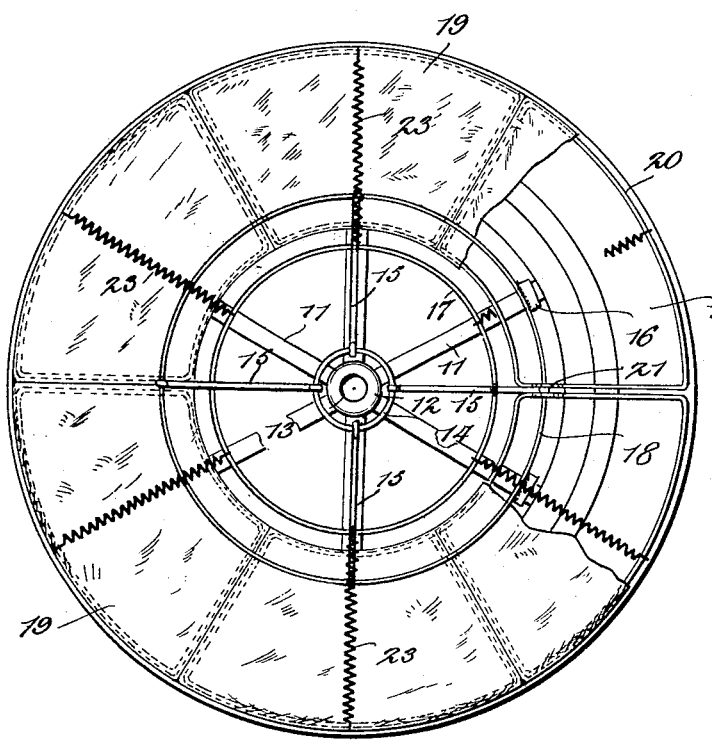
Figure 1 is a side elevation of an automobile wheel provided with my improvements.
Figure 2:
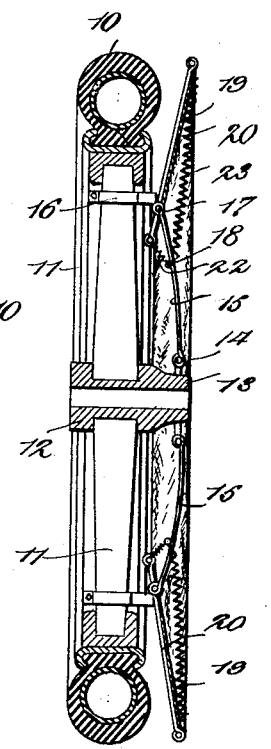
Figure 2 is a vertical sectional view of the same.
Figure 3:
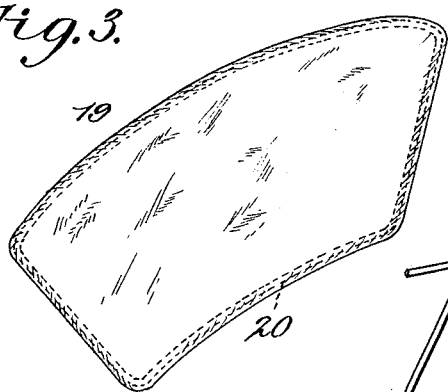
Figure 3 is a detail view of one of the flaps.
Figure 4:
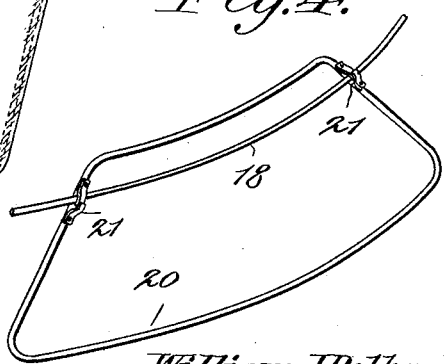
Figure 4 is a detail view of one of the spring catches.

Pedestrians have been subjected to considerable annoyance and loss by having their clothing splashed with dirty water and mud thrown by vehicles passing along streets and roads after rains. It is the purpose of this invention to provide means which may be readily associated with vehicle wheels for catching this splashed water and mud.

Referring to the drawing in detail, 10, 11 and 12 represent respectively the tire, spokes and hub of an automobile wheel, and 13 represents the usual wheel cap all of which may be of any well known construction. A ring of heavy wire 14 of somewhat larger diameter than the cap 13 is supported concentric with the cap by four ribs or strips 15, of metal or other suitable material, the outer ends of which are secured by suitable clamps 16 to the spokes 11. The clamps 16 will be made in different manner where the device is to be applied to wheels having wire spokes than where the device is to be applied to wheels having wooden spokes. However, various forms of well known clamps will readily suggest themselves to those skilled in the art, and the particular form of clamp is not considered an essential feature of the invention. Two other rings of stout wire 17 and 18 are mounted on the strips 15 in any suitable manner and concentric with the ring.

The detachable flaps 19 are preferably segmental in form and are formed of fabric stretched over a framework 20 which may be of wire or other suitable material. Catches or fasteners 21 are secured to the outer surface of each flap and may be adjusted to secure the respective flaps to the ring 17. When the flap is in place on the ring 17, the inner portion is then secured to the wire 18 by a spring 22 and the outer portion by a spring 23, so that the flap is held at an angle of about thirty degrees from the vertical and a slight distance above the road level.

It will be readily seen that when driving a car provided with this device, the mud and water splashed outwardly will be deflected by the flaps and will drop to the road without striking any person whom the car may be passing at the time.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. An anti-splash attachment for vehicle wheels comprising a plurality of concentric rings, means for securing said rings to each other and to a wheel, a plurality of deflecting flaps removably secured to one of said rings and provided with springs for attachment to another of said rings.

2. An anti-splash attachment for vehicle wheels comprising a central member, strips secured to said central member and radiating therefrom, means for securing said strips to the spokes of a wheel, an outer member supported by said strips, deflector flaps, means for removably securing said flaps to said outer member, and resilient means for holding said flaps in deflecting position.

In testimony whereof I have affixed my signature.

WILLIAM J. ROTHMANN.